United States Patent Office 3,278,986
Patented Oct. 18, 1966

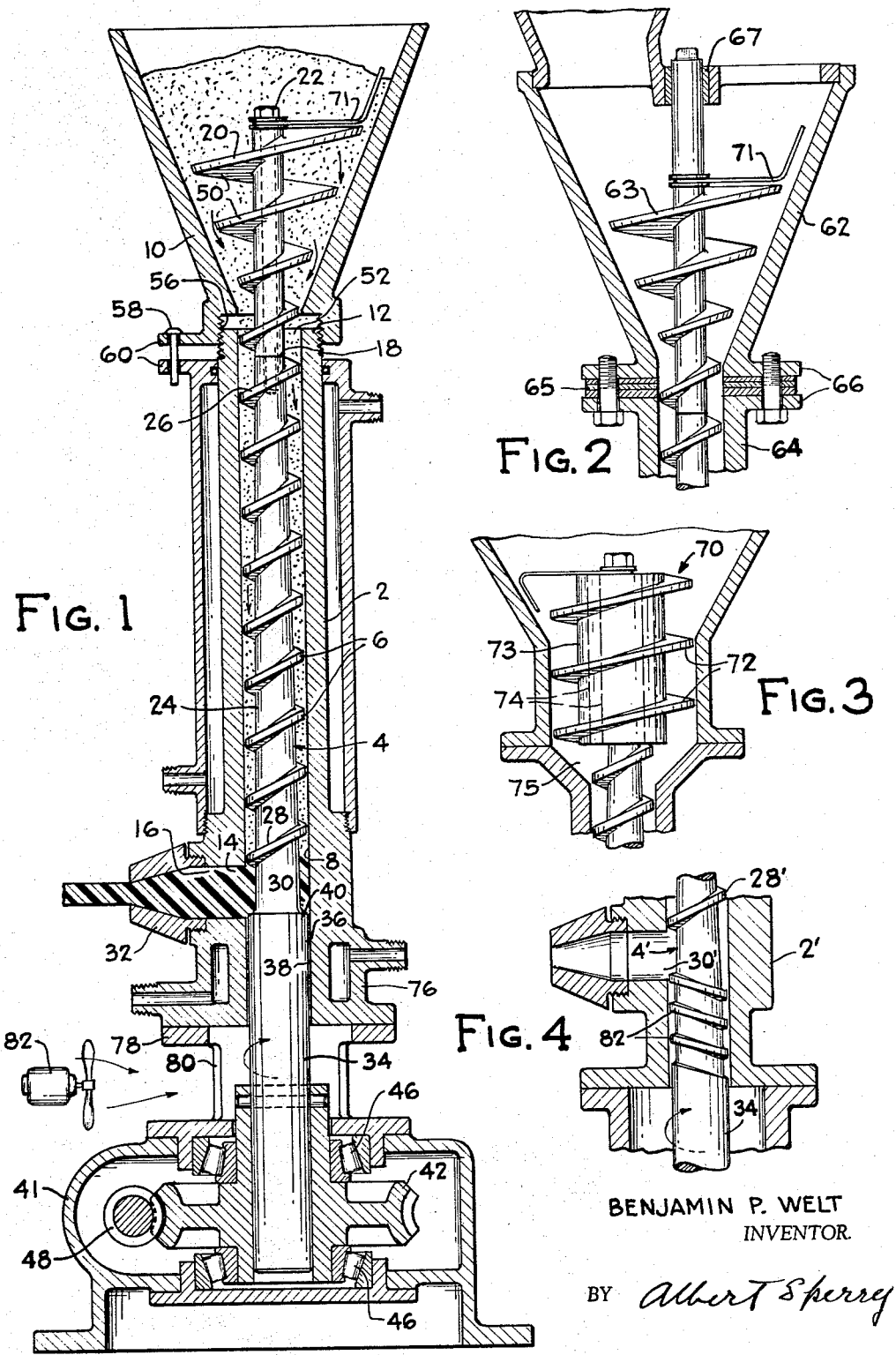
BENJAMIN P. WELT
INVENTOR.
BY Albert Sperry
ATTORNEY though the type of screw member necessary

3,278,986
PLASTIC COMPOUNDER
Benjamin P. Welt, 16 Hart Drive N., South Orange, N.J.
Filed Aug. 29, 1963, Ser. No. 305,331
2 Claims. (Cl. 18—12)

This invention relates to screw type extruders and compounders for use with plastic compositions and is directed particularly to equipment wherein the load applied to the thrust bearing by the screw member is decreased and the output of the equipment is increased. The invention is further directed to equipment wherein the compression ratio to which the material is subjected during the compounding or extrusion thereof is readily variable without resort to changes in the screw member employed.

It has been common practice heretofore to compound or extrude plastic material by feeding the same to an extrusion tube wherein a screw member is rotatable, and to force the material through the tube to an outlet where the composition may be shaped by a die as it is forced from the equipment. However, in compounding or extruding plastic materials, such as vinyl resins or the like, the resin is sometimes presented in the form of pellets or granules, and it sometimes is in the form of a light, fluffy material. Moreover, various types and amounts of plasticizers, solvating agents, fillers, pigments, and the like may be incorporated in the plastic composition prior to or during the compounding or extruding operation depending upon the nature of the end product to be produced. As a result, the type of screw member necessary for handling any particular plastic composition or for developing any particular compression ratio within the equipment will vary greatly. Numerous different screw members, therefore, must be provided and the equipment dismantled to make the necessary change from one screw member to another each time a composition having different properties or characteristics is to be handled or produced. Moreover, the thrust bearing assembly employed in prior extrusion and compounding equipment must be ruggedly designed to take the very high backward loadings on the screw developed by pressure generated at the outlet end of the screw.

Constructions of the prior art also have been limited in their output by reason of the fact that the screw member has generally been driven by a motor or gearing located adjacent the inlet end of the extrusion tube. When thus driven, the root diameter of the screw member adjacent the inlet end of the extrusion tube must be relatively large in order to withstand the torque applied to the screw member. As a result, the volume or capacity of the space between the root or body of the screw member and the inner walls of the extrusion tube to which the material is supplied is relatively limited and the amount of material advanced through the extrusion tube on each turn of the screw member is correspondingly reduced. This problem is particularly troublesome when the material being handled is to be subjected to a high compression ratio, since it is not practical to increase the root diameter of the screw member at the end thereof remote from the point where the driving force is applied. Therefore, it is generally necessary to resort to the use of special and expensive screw members wherein the pitch of the flights or turns of the screw member is varied to increase the force applied to the material as it is moved toward the outlet end of the extrusion tube.

In accordance with the present invention, these limitations and objections inherent in prior screw type extruding and compounding equipment are overcome and means are provided whereby the compression ratio of the equipment may be readily varied without changing the screw member employed and the forces exerted on the thrust bearing of the equipment are balanced so that such bearings can be greatly simplified or eliminated altogether.

These advantages are preferably attained by providing variable or interchangeable feeding and metering means for supplying the plastic composition to the extrusion tube and screw member and by forming the screw member with a root or body portion presenting pressure balancing surfaces at opposite sides of the outlet opening from the extrusion tube. In the preferred embodiments of the present invention, the screw member has a root portion or body which may be relatively small in diameter at a point adjacent the inlet end of the extrusion tube but increases in diameter toward the discharge end of the tube. Furthermore, the screw member is driven from the end thereof adjacent the discharge end of the extrusion tube where the root diameter of the screw member is of maximum diameter. In this way, it is possible to apply the desired torque and driving forces to the screw member without danger of injury thereto, and at the same time, to increase the output capacity and/or the compression ratio of the equipment.

Accordingly, the principal objects of the present invention are to reduce the cost and increase the utility and output of extruding and compounding equipment, to reduce the forces applied to the thrust bearings employed in extrusion and compounding equipment, and to permit ready change in the compression ratio of such equipment without changing the screw member employed.

These and other objects and features of the present invention will appear from the following description thereof wherein reference is made to the figures of the accompanying drawings.

In the drawings:

FIG. 1 is a vertical sectional view through a typical form of extruding and compounding equipment embodying the present invention;

FIG. 2 illustrates an alternative form of feed varying means adapted for use in the present invention;

FIG. 3 is a diagrammatic vertical sectional view through an alternative form of feeding and metering means adapted for use with the equipment of FIG. 1; and FIG. 4 is a sectional view through an alternative form of the equipment which may be employed adjacent the discharge end of the extrusion tube.

In that form of the invention chosen for purposes of illustration in FIG. 1, the equipment is provided with an extrusion tube 2 of cylindrical cross section having a screw member 4 located therein and provided with screw flights or turns 6 which afford a limited or usual clearance between the periphery of the screw flights and the inner cylindrical walls 8 of the extrusion tube 2. The material to be compounded or extruded is fed into the extrusion tube 2 from a hopper 10 or other supply source located adjacent the inlet end 12 of the tube so as to be supplied to the flights or turns 6 of the screw member for movement through the extrusion tube to an outlet end 14 and the discharge opening 16 through which the plastic composition is discharged from the tube. The end 18 of the screw member 4 is located adjacent the inlet end 12 of the extrusion tube 2 and a feeding or metering member 20 is located in the hopper 10 and secured to the screw member 4 by a bolt 22 or the like so as to rotate with the screw member.

The root or body 24 of the screw member 4 is preferably tapered from the end 18 thereof where the initial turn or portion 26 of the screw flight 6 is located so as to increase in diameter toward the outlet end 14 of the extrusion tube where the final turn 28 of the screw flight is located. The final turn 28 of the screw member is positioned at one side of a pressure chamber 30 from which the composition being handled is forced through the discharge opening 16 of the extrusion tube 2. A die, screen or other usual member 32 may be secured to the tube 2 at the discharge opening for shaping the material issuing from the equipment as desired.

The screw member 4 has a shaft 34 secured to the larger end of the root portion thereof and the shaft preferably is formed as an integral part of the screw member. The shaft 34 extends through the pressure chamber 30 and has a bearing portion 36 rotatably mounted within a sleeve or mounting 38. A pressure balancing means or shoulder 40 is formed on the shaft 34 and serves as a closure for the pressure chamber 30 located on the side of the chamber opposite to and spaced from the final turn 28 of the screw member. The diameter of the shaft 34 is substantially equal to the diameter of the root portion of the screw member adjacent the last turn 28 thereof; whereas, the diameter of the shoulder or pressure balancing means 40 on the shaft is substantially equal to the diameter of the last turn 28 of the screw member. The pressure to which the composition is subjected within the pressure chamber 30 may be as high as 10,000 pounds per square inch, but in any event, such pressure will be exerted with equal force and in opposite directions against the last turn 28 of the screw member and the pressure balancing shoulder 40 on the shaft 34. In this way, the thrust on the screw member resulting from the pressure applied to the composition is neutralized and the usual heavy and expensive thrust bearing constructions heretofore required can be dispensed with. Nevertheless, as shown, a simple or conventional thrust bearing will ordinarily be employed, and for this purpose, shaft 34 preferably extends into a gear box 41 and a worm gear 42 is secured to the shaft by a key 44. The shaft 34 then is provided with the thrust bearings 46 and is driven by a worm 48 meshing with worm gear 42 or by other suitable power driven means.

The construction thus provided further serves to locate that portion of the root or body 24 of the screw member 4 which is of largest diameter and which, therefore, possesses the greatest strength in the portion of the extrusion tube where the greatest pressures and torsional forces are developed. At the same time, the portion of the body of the screw member near the inlet end of the extrusion tube, where compression of the material is at a minimum and the forces exerted on the screw member are limited, may be of relatively small diameter and possess less strength without danger of injury to the screw member upon the application of a relatively large torque thereto.

In accordance with the present invention, the end of the screw member 4 adjacent the inlet end 12 of the extrusion tube 2 has feeding and metering means 20 secured thereto and rotatable therewith. The feeding means illustrated in FIG. 1 is in the form of a supplemental screw element which has successive turns or flights 50 which are of increasing diameter and present outer peripheral edges which conform generally to the shape of the hopper 10 and are substantially parallel to or equally spaced from the inner surface of the hopper. Such feeding and metering means serve to move the material to be compounded or extruded from the hopper to the inlet end 12 of the extrusion tube where it will be received by the screw member 4. The amount of material thus applied to the screw member by the feeding means will depend upon the spacing, angle of inclination, and diameter of the flights or turns 50 of the feeding means. Thus, widely spaced flights having a high pitch or angle of inclination and a large diameter will serve to feed relatively large amounts of material to the extrusion tube with each turn of the feeding means 20 with the screw member 4. On the other hand, more closely spaced flights or turns 50 on the feeding means 20, which are inclined at a limited angle or are of relatively small diameter, will serve to feed a lesser amount of material to the inlet end 12 of the extrusion tube.

As the material to be compounded is fed from the hopper 10 to the inlet end 12 of the extrusion tube, it will enter the throat or space 52 between the inner surface 8 of the extrusion tube 2 and the initial turn 26 of the screw member 4. The compression or packing of the material entering the throat 52 will be determined by the nature of the material and by the form of feeding means employed. Thus, if the material fed to the extrusion tube from the hopper or supply source is light and fluffy or contains large air spaces, the feeding and compacting of the material which is effected by the feeding means, even when large amounts of material are fed to the extrusion tube, may merely serve to expel air from the material without actually subjecting it to substantial pressure. However, if the material is initially relatively dense or compact and contains few air spaces, the same feeding means may serve to subject the material to substantial compression as it enters the throat 52 of the extrusion or compounding equipment. It has been found in practice that very substantial differences in the properties of materials, such as vinyl resins, may occur when the materials are produced by the "evaporation method" instead of a "solution method" or when ordered from different manufacturers. In any event, the compression ratio to which the material is subjected in passing through the extrusion tube will largely depend upon the density of the material and the pressure to which it is subjected at the throat 52 of the extrusion tube. Therefore, in order to enable the equipment to handle a wide range of materials differing in character and composition and in order to alter the compression ratio of the equipment, a group or series of interchangeable feeding means differing from one another in their form and the diameter, pitch and spacing of the screw flight or the root diameter thereof may be provided. Such feeding means may be secured to the screw member 4 by the bolt 22 or in any other suitable manner permitting ready change thereof with a change in the material to be handled.

The compression ratio to which the material is subjected further depends, of course, upon the form of the screw member 4 by which the material is forced through the extrusion tube from the throat 52 to the pressure chamber 30. However, the compression ratio developed by any screw member can further be controlled or varied by proper selection of the form or type of feeding means 20 employed. Removal or change of the screw member 4, therefore, generally is not necessary since the same screw member can be employed with any, or a wide range of, material; and changes in the compression ratio of the equipment can be effected readily and the "down time" ordinarily lost in order to adapt the equipment for use with differing types of plastic compositions is saved. The flexibility and usefulness of the equipment is thereby greatly extended so that any unit may be used for compounding or extruding a wide range of compositions varying greatly in their physical or chemical properties.

While it will ordinarily be desirable to supply each unit with a number of interchangeable feeding means, it is possible to vary the action of the feeding means without changing the same and such changes can even be effected while the equipment is in operation to vary the compression ratio thereof within a limited range. Thus, as shown in FIG. 1, the hopper 10 may be secured to the upper end of the extrusion tube 2 by a threaded connection, as shown at 56, or by any other suitable adjustable means which allow the hopper 10 or the feeding means 20 to be moved axially with respect to each other. In this way, the distance or space between the peripheral edges of the flights 50 of the feeding means and the inner surface of the hopper 10 can be varied and the action of the feeding means in moving or compacting the material entering the throat 52 of the equipment can be altered. The compression ratio of the equipment can be controlled in this way and adjustments can be made while the equipment is in operation by rotating the hopper relative to the extrusion tube until the proper conditions are attained for compounding or extruding the particular material being handled. Suitable holding means, such as a pin 58, may be passed through flanges 60 on the extrusion tube and hopper to prevent relative rotation thereof upon rotation of the feeding means 20 within the hopper 10.

In the alternative, as shown in FIG. 2, the relative position of the hopper 62 with respect to the feeding means 63 and the adjacent end of the extrusion tube 64 can be varied by the insertion of one or more spacers 65 between the flanges 66 if desired. The construction of FIG. 2 also illustrates an arrangement whereby the hopper 62 may be provided with a bearing 67 at the upper end 69 of the feeding or metering member 63 to assure accurate centering of the feeding means with respect to the hopper. Further, as shown in FIGS. 1 and 2, a wire or other element 71 may be carried by the feeding means and rotatable therewith to prevent cavitation of dry, powdered or sticky material which does not flow downward readily within the hopper.

An alternative form of feeding means 70 is illustrated diagrammatically in FIG. 3 wherein the flight 72 of the feeding means are substantially equal in diameter. A group or series of such feeding means having root or body portions 73 which vary in diameter, as represented by the dotted lines 74, may then be provided to vary the amount of material fed to the throat 75 of the extruding equipment by the feeding means.

In using any of the variable feeding means of the present invention, the amount of material fed to the extrusion tube can be controlled to starve or heavily load the extrusion tube and screw member as desired or necessary in handling any particular type or composition of material and to establish and maintain any desired compression ratio in compounding or extruding the material. Moreover, the use of such feeding means renders it possible to increase the output of the equipment very substantially. Thus, for example, if it is necessary to develop a compression ratio of, say, 1 to 4 or 1 to 8, or any other ratio desired, the depth of the turns of the screw member can be increased or the diameter of the root of the screw member decreased to afford a larger capacity or space for the material between successive turns of the screw member and between the root of the screw member and the inner wall 8 of the extrusion tube 2. The feeding means then employed can be formed to feed sufficient material to the extrusion tube to initially compress the material and to load the screw member to an extent sufficient to establish and maintain the desired compression ratio. At the same time, the volume of the material fed to the pressure chamber 30 with each turn of the screw member will be increased and the output of the equipment will be correspondingly increased. Such an increase in the output of the equipment will be effected without sacrifice in the working of the material and without increasing the speed of rotation of the screw member.

In each of the forms of the present invention, a substantial amount of heat is developed. The shaft 34 of the screw member 4 will, therefore, tend to become relatively hot. In order to dissipate such heat, a water jacket 76 may surround the sleeve 38. The collar 78 below the sleeve 76 also may be cut away, as shown at 80, and may be cooled by a blast of air from a blower 82 if desired. The blower further may serve to remove any of the plastic composition which is forced through the sleeve 36 about the shaft 34. While the amount of the composition thus lost is negligible, it performs a useful function in that it serves to establish a continuously renewed seal for the shaft 34, and since it is cooled by the water jacket 76, it becomes relatively stiff and so viscous as to reduce leakage of material about the shaft to a minimum.

The gear box 41 and collar 78 constitute, together, a housing for the described drive means, and for the portion of the shaft that projects beyond the compression chamber.

As further shown in FIG. 4, the shaft 34' of the extrusion screw member 4' may, in the alternative, be provided with reversely inclined screw flights 82 located on the side of the compression chamber 30' opposite to the final turn 28' of the screw flights on the screw member. The pitch of the screw flights 82 preferably is less than that of the turn 28' of the screw member; whereas, the root diameter of the shaft 34' by which the reverse turns 82 are carried may be equal to or greater than that of the root of the screw member 4'. Constructions of this type serve as balancing means opposing the thrust forces developed by the screw member in moving and compounding the composition within the extrusion tube 2' of the equipment.

In each of the forms of the invention described, the feeding means is variable to supply the composition to be handled from the hopper or supply source to the extrusion tube in a manner suitable to establish and maintain the correct compression ratio during the compounding or extrusion operation. Although the equipment preferably is maintained in an upright position, as illustrated, the composition may be fed to a horizontal extrusion tube from a hopper or source of supply extending vertically or laterally adjacent the inlet end of the extrusion tube.

In any event, the feed of the material to the extrusion tube and the compression ratio developed in the equipment can be controlled by employing feeding means of various types. Thus, the feeding means may have screw flights of suitably varied diameter and pitch to meet the operating conditions desired, or alternative feeding means having screw flights of uniform flight diameter, but varying in the root diameter thereof, can be used. Moreover, when either type of feeding means is employed, the relative positions of the feeding means and hopper can be adjusted so as to control the amount of material moved into the throat of the extrusion tube on each rotation of the screw member.

At the same time, the capacity of the equipment is materially increased by reason of the fact that the root diameter of the screw member adjacent the inlet end of the extrusion tube may be made relatively small as compared to that required when the screw member is driven from a point adjacent the inlet end of the tube. The depth of the turns of the screw member used can, of course, be chosen to give the desired output of the compounded material; whereas, the thrust bearing assembly used in the equipment may be relatively simple and light in construction by reason of the balancing effect of the elements located at opposite sides of the compression chamber and outlet from the extrusion tube through which the composition is discharged.

In view thereof, it will be apparent that numerous changes and modifications may be made in the form, construction, arrangement and combination of the elements employed. In view thereof, it should be understood that the particular embodiments of the invention shown in the drawings and described above are intended to be illustrative only and are not intended to limit the scope of the invention.

I claim:

1. Equipment for use in compounding and extruding plastic materials, comprising:
    (1) An extrusion tube having an inlet at one end and communicating adjacent its opposite end with a pressure chamber having an outlet for extruded material;
    (2) A screw member within said tube extending from said one end thereof to the pressure chamber, said opposite end of the tube having an axial opening, said screw member including a shaft a portion of which projects through said opening;
    (3) Cooling means extending about the tube adjacent said opposite end of the tube, to cool material forced through the axial opening about the shaft, thereby to increase the viscosity thereof to effect a seal about the shaft where it extends through said axial opening;

(4) Drive means for the screw member connected to the projecting portion of the shaft;
(5) A housing fixed to said opposite end of the tube and enclosing said shaft portion and drive means;
(6) A bearing for said shaft portion mounted in the housing between the tube and drive means in axially spaced relation to said opposite end of the tube, said housing having openings in communication with the space between the bearing and tube; and
(7) Fan means adjacent the housing directing an air current through said openings across said shaft portion in close proximity to the axial opening of the tube to both cool the shaft and strip therefrom plastic material coating the surface of said shaft portion after passage of the material out of the axial opening.

2. Equipment as in claim 1, wherein said housing openings are diametrically opposite one another, said fan means directing said air current diametrically of the shaft portion, said housing openings being disposed in the path of said current to constitute an inlet and outlet, respectively, therefore.

References Cited by the Examiner

UNITED STATES PATENTS

| | | | |
|---|---|---|---|
| 2,011,055 | 8/1935 | Klugh | 18—12 X |
| 2,014,617 | 9/1935 | Fischer | 18—12 |
| 2,453,088 | 11/1948 | Dulmage | 18—12 |
| 2,531,305 | 11/1950 | Smith | 222—413 X |
| 2,662,243 | 12/1953 | Schnuck et al. | 18—12 |
| 2,707,306 | 5/1955 | Weber et al. | 18—12 X |
| 2,872,703 | 2/1959 | Gambrill et al. | 18—12 |
| 2,920,347 | 1/1960 | Joukainen et al. | 18—12 |
| 3,006,029 | 10/1961 | Saxton | 18—12 |
| 3,008,184 | 11/1961 | Fritsch | 18—12 |
| 3,113,843 | 12/1963 | Wen Han Li | 18—12 X |
| 3,156,009 | 11/1964 | Alsys | 18—12 |
| 3,177,527 | 4/1965 | Nelson | 18—12 |

WILLIAM J. STEPHENSON, *Primary Examiner.*

J. SPENCER OVERHOLSER, *Examiner.*

L. S. SQUIRES, *Assistant Examiner.*